US011003239B2

(12) United States Patent
Sinha et al.

(10) Patent No.: US 11,003,239 B2
(45) Date of Patent: May 11, 2021

(54) POWER CONSUMPTION MANAGEMENT IN AN INFORMATION HANDLING SYSTEM

(71) Applicant: DELL PRODUCTS, L.P., Round Rock, TX (US)

(72) Inventors: Prasoon K. Sinha, Bangalore (IN); Ross K. Burns, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 142 days.

(21) Appl. No.: 15/966,115

(22) Filed: Apr. 30, 2018

(65) Prior Publication Data

US 2019/0332164 A1  Oct. 31, 2019

(51) Int. Cl.
*G06F 1/3287* (2019.01)

(52) U.S. Cl.
CPC ................. *G06F 1/3287* (2013.01)

(58) Field of Classification Search
USPC .......................................................... 700/294
See application file for complete search history.

(56) References Cited

U.S. PATENT DOCUMENTS

| 8,103,388 | B2* | 1/2012 | Goodnow | G06F 1/305 |
| | | | | 700/291 |
| 8,862,922 | B2* | 10/2014 | Akers | G06F 1/3206 |
| | | | | 713/324 |
| 9,620,959 | B2* | 4/2017 | Sen | G06Q 50/06 |
| 9,625,967 | B1* | 4/2017 | Throop | G06F 1/3203 |
| 2014/0108831 | A1 | 4/2014 | Dube et al. | |
| 2015/0177813 | A1* | 6/2015 | Bailey | G06F 1/3234 |
| | | | | 713/320 |
| 2015/0177814 | A1* | 6/2015 | Bailey | G06F 1/3234 |
| | | | | 713/320 |
| 2015/0338896 | A1* | 11/2015 | Khatri | G06F 1/324 |
| | | | | 713/320 |
| 2017/0031431 | A1* | 2/2017 | Khatri | G06F 1/266 |
| 2018/0004265 | A1 | 1/2018 | James et al. | |
| 2018/0024603 | A1 | 1/2018 | Guruprasad et al. | |
| 2018/0052431 | A1 | 2/2018 | Shaikh et al. | |

* cited by examiner

*Primary Examiner* — Md Azad
(74) *Attorney, Agent, or Firm* — Isidore PLLC

(57) ABSTRACT

A method for power consumption management in a datacenter. A processor retrieves a power usage model and historical power data for devices in the datacenter and calculates a first supply power from a power supplier that is available for distribution to the datacenter during a load shedding time period. A first power usage for the datacenter is calculated during the load shedding time period. The method further includes determining if the first supply power is greater than the first power usage for the datacenter during the load shedding time period. In response to determining that the first supply power is not greater than the first power usage, a first device in the datacenter is identified to reduce power consumption. The first device in the datacenter is triggered to reduce power consumption during the load shedding time period.

20 Claims, 7 Drawing Sheets

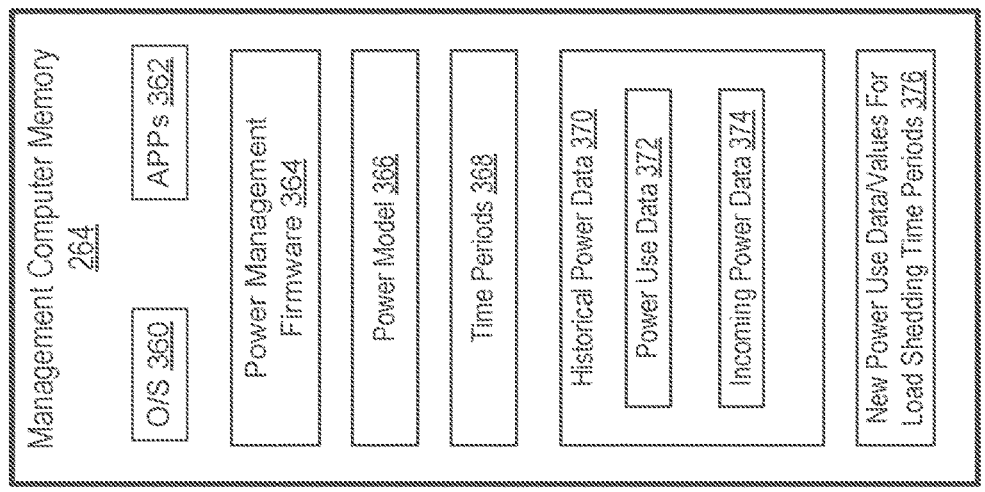
FIG. 3C
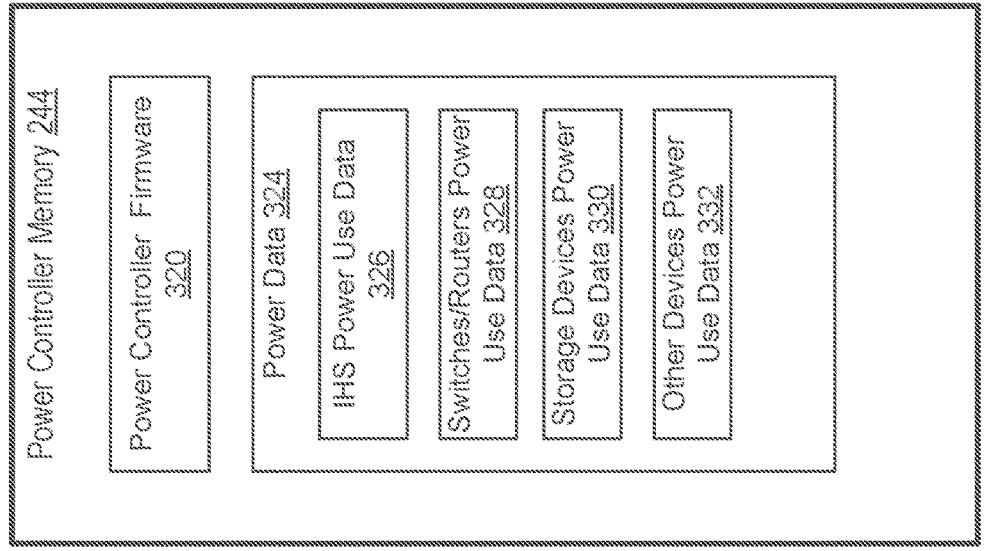
FIG. 3B
FIG. 3A

POWER CONSUMPTION MANAGEMENT IN AN INFORMATION HANDLING SYSTEM

BACKGROUND

1. Technical Field

The present disclosure generally relates to information handling systems and in particular to power consumption management in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providing power management to an information handling system is important to prevent loss of data and to maintain system reliability. During operation of an information handling system, events can occur that interrupt or reduce the amount of incoming AC power to the information handling system. Electrical power producers respond to overall power consumed on an electrical power grid. When electrical power consumption exceeds the capacity of the power grid to provide electrical power, the electrical power producers must change the distribution of electrical power to avoid failures. These changes in distribution result in the lowering of voltage in electrical power supplied to geographic areas, commonly referred to as a brownout. Drastic changes in the distribution may result in the total loss of power, referred to as blackouts.

BRIEF SUMMARY

Disclosed are a method, an information handling system (IHS), and a power consumption management system for power consumption management in a datacenter.

According to one embodiment, the method includes retrieving, by a processor, a power usage model and historical power data for a plurality of devices in the datacenter. The method further includes calculating, based on the power usage model and historical power usage data, a first supply power from a power supplier that is available for distribution to the datacenter during a first load shedding time period. The first load shedding time period is a future time period during which the power supplier reduces an amount of power available to the datacenter. The method further includes calculating, based on the power usage model and historical power usage data for the datacenter, a first power usage for the datacenter during the first load shedding time period, and determining if the first supply power is greater than the first power usage for the datacenter during the first load shedding time period. In response to determining that the first supply power is not greater than the first power usage for the datacenter during the first load shedding time period, identifying at least one first device in the datacenter to reduce power consumption. The method further includes triggering the at least one first device in the datacenter to reduce power consumption during the first load shedding time period.

Also disclosed is an IHS that comprises a management processor and a network communication device communicatively coupling the IHS to a datacenter that includes a plurality of devices including at least one computing device and a power subsystem. A memory device stores power consumption management firmware that is executed by the processor to enable power consumption management of the datacenter. The management processor is communicatively coupled to the memory and is communicatively coupled to the devices via the network communication device. The power consumption management firmware configures the management processor to retrieve a power usage model and historical power data for the devices in the datacenter and to calculate, based on the power usage model and historical power usage data, a first supply power from a power supplier that is available for distribution to the datacenter during a first load shedding time period. The first supply power is calculated based on historical power consumption values during the first load shedding time period. In one embodiment, the first supply power can be specified by the power supplier based on estimated consumption values during the first load shedding time period. The first load shedding time period is a future time period during which the power supplier reduces an amount of power available to the datacenter, as determined by evaluating the historical power metrics/data. Based on the power usage model and historical power usage data for the datacenter, the management processor calculates a first power usage for the datacenter during the first load shedding time period. The management processor further determines if the first supply power is greater than the first power usage for the datacenter during the first load shedding time period. In response to determining that the first supply power is not greater than the first power usage for the datacenter during the first load shedding time period, the management processor identifies at least one first device in the datacenter to reduce power consumption and triggers the at least one first device in the datacenter to reduce power consumption during the first load shedding time period. The management processor reduces power consumption in the datacenter to match the first supply power during the first load shedding time period.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a block diagram illustrating example contents of a power controller memory, in accordance with one embodiment;

FIG. 3B is a block diagram illustrating example contents of a remote access controller memory, in accordance with one embodiment;

FIG. 3C is a block diagram illustrating examples of a management computer memory, in accordance with one embodiment;

DETAILED DESCRIPTION

Figure 1:
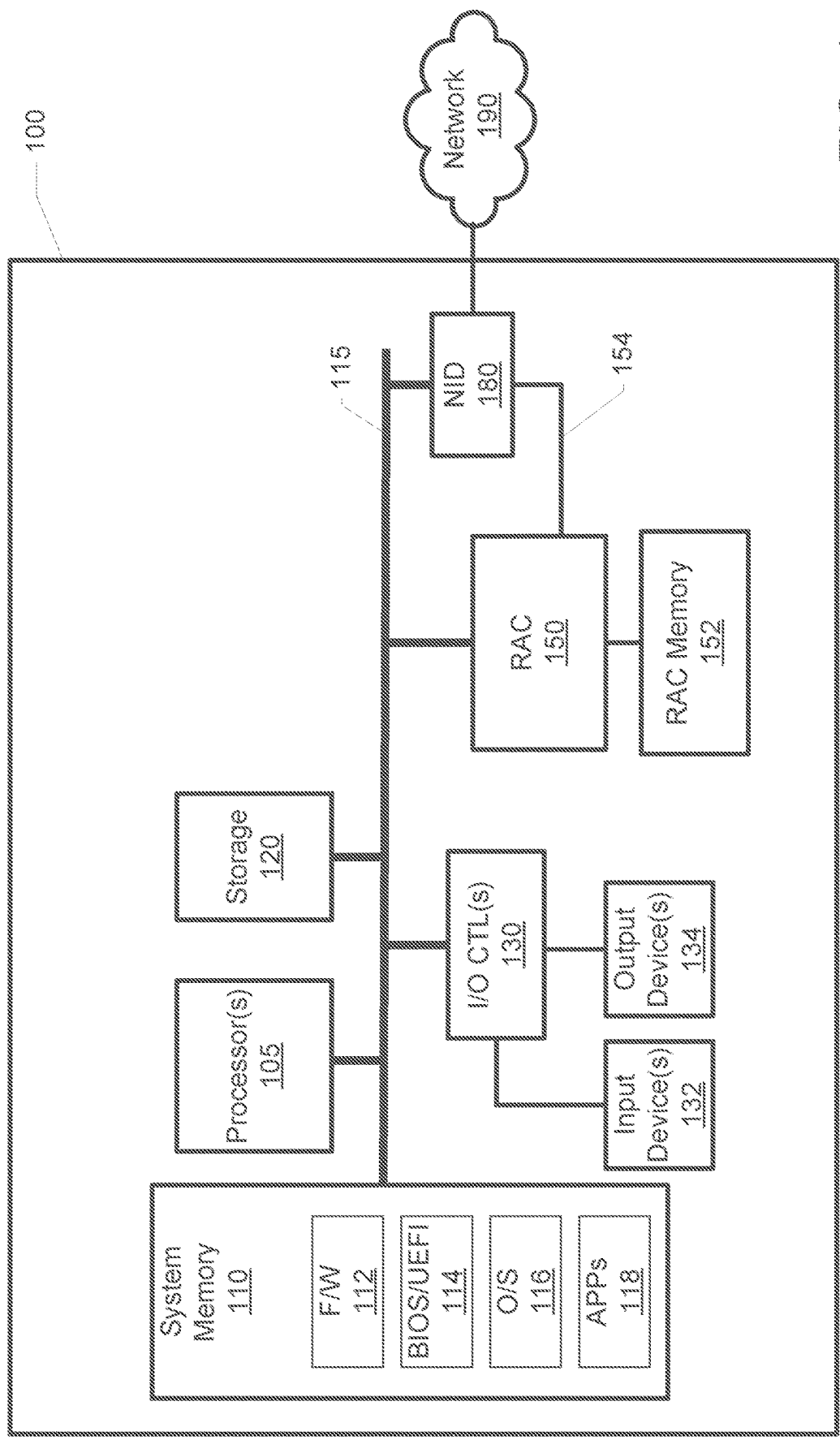
FIG. 1 is a block diagram illustration of an example information handling system (IHS), according to one or more embodiments.

The illustrative embodiments provide a method, an information handling system (IHS) and a power consumption management system for power consumption management in a datacenter.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Further, those of ordinary skill in the art will appreciate that the hardware components and basic configuration depicted in the various figures (e.g. FIG. 1) and described herein may vary. For example, the illustrative components within IHS 100 (FIG. 1) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and is thus illustrated as and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

Additionally, in one or more embodiments, IHS 100 includes a remote access controller (RAC) 150. RAC 150 is in communication with processor(s) 105 and system memory 110 via system interconnect 115. RAC 150 provides management functions that allow an administrator to deploy, monitor, manage, configure, update, troubleshoot and remediate IHS 100. RAC 150 is also coupled to RAC memory 152. RAC 150 is also communicatively coupled to one or more network interface devices (NID) 180 via a sideband bus 154.

RAC 150 can monitor and control the operation of IHS 100 and other systems and devices communicatively coupled to IHS 100. RAC 150 can also perform configuration and remote control of other connected IHSs. Certain software and/or firmware modules stored in RAC memory 152 can be executed by RAC 150. RAC 150 includes specific firmware that enables RAC 150 to perform various functions described herein. RAC 150 can contain components that control specific operations of IHS 100 such as power and thermal management. In one embodiment, RAC 150 can monitor and record the instantaneous and average power usage of IHS 100 and provide power data to other IHSs and computers.

IHS 100 further comprises NID 180 that is in communication with system interconnect 115. NID 180 enables IHS 100 to communicate and/or interface with other devices, services, and components that are located external to IHS 100. These devices, services, and components can interface with IHS 100 via an external network, such as example network 190, using one or more communication protocols. Network 190 can be a local area network, wide area network, personal area network, and the like, and the connection to and/or between network and IHS 100 can be wired or wireless or a combination thereof. For purposes of discussion, network 190 is indicated as a single collective component for simplicity. However, it is appreciated that network 190 can comprise one or more direct connections to other devices as well as a more complex set of interconnections as can exist within a wide area network, such as the Internet.

Figure 2:
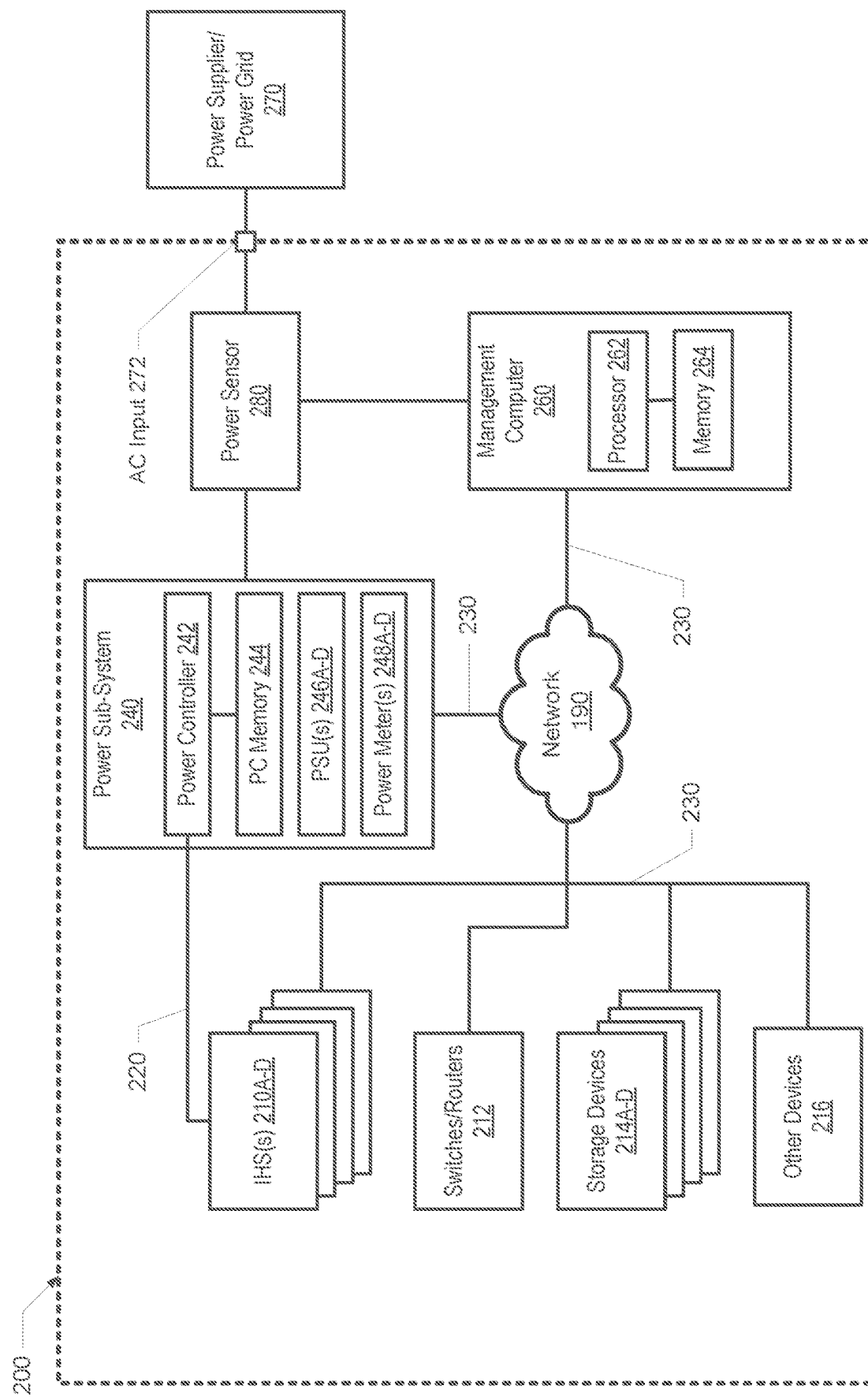
FIG. 2 is a block diagram illustrating an example datacenter, in accordance with one embodiment.

FIG. 2 illustrates a datacenter 200 that receives electrical power from a power supplier or power grid 270 via an AC input 272. Datacenter 200 includes various devices that consume power during operation. Examples of these devices include several IHSs that are individually labeled as IHSs 210A-D. Each of IHSs 210A-D can have the same architecture and components as IHS 100. While four IHSs are shown in FIG. 2, datacenter 200 can have a much larger number of IHSs, such as hundreds or thousands of IHSs. IHSs 210A-D are communicatively coupled to network 190. Datacenter 200 further includes one or more switches and/or routers 212. Switches and/or routers 212 are devices in a computer network that connect other devices and networks together. Switches and/or routers 212 enable communication between different devices and different networks. While one switch and/or router are shown in FIG. 2, datacenter 200 can have a much larger number, including hundreds of switches and/or routers, for example.

Datacenter 200 further includes several storage devices that are individually labeled as storage devices 214A-D. Storage devices 214A-D can be hard drives or solid state drives that store data and information. While four storage devices are shown in FIG. 2, datacenter 200 can have a different number of storage devices. Datacenter 200 further includes other devices 216 such as fans, displays, lights, heating and cooling devices, and other devices that consume power during the operation of datacenter 200. In one embodiment, IHSs 210A-D, switches/routers 212, storage devices 214 and other devices 216 can be in communication with network 190 via network cables 230.

Datacenter 200 includes a power subsystem 240. Power subsystem 240 can monitor, control and regulate power supplied to one or more devices within datacenter 200. Power subsystem 240 can be in communication with network 190 via network cables 230 and can be in communication with IHSs 210A-D via a power bus 220 such as an I2C bus. Power subsystem 240 includes a power controller 242, power controller memory 244, a plurality of power supply units (PSUs) 246A-D and power meters 248A-D. Power controller 242 is communicatively coupled to power controller memory 244. PSUs 246A-D supply power to one or more of each of IHSs 210A-D, switches/routers 212, storage devices 214, other devices 216, and other components within datacenter 200 that require power via either one or more bus bars or power cables (not shown). Power controller 242 can receive power supply data, capacity, usage and settings from PSUs 246A-D. Power meters 248A-D can measure the power usage for devices within datacenter 200 that do not receive power from PSUs 246A-D. Power controller 242 can receive measured power usage data from power meters 248A-D.

As one aspect of power distribution within datacenter 200, power controller 242 can monitor and record (i) power consumption and workload data across the datacenter, as well as (ii) the amount of available power provided by the PSUs. Power controller 242 can transmit power usage data to IHSs 210A-D from their respective PSUs via power bus 220. In an embodiment, power controller 242 can reduce power to at least some of the devices within datacenter 200. Power controller 242 can monitor and record the power consumption for switches/routers 212, storage devices 214 and other devices 216 via data received from PSUs 246A-D and/or power meters 248A-D.

Datacenter 200 further includes management computer 260. Management computer 260 can have a similar architecture and components as IHS 100. Management computer 260 includes management processor 262 that is communicatively coupled to management memory 264. Management memory 264 can store specific firmware that enables management processor 262 to perform various functions described herein. Management computer 260 can be in communication with network 190 via network cables 230. Management computer 260 is in communication with a power meter or power sensor 280. Power sensor 280 can measure the amount of available incoming power that is being supplied to datacenter 200 and transmit the available incoming power data to management computer 260. Power subsystem 240 can also be in communication with power sensor 280.

FIGS. 3A, 3B and 3C illustrate further details of the contents of power controller memory 244, RAC memory 152, and management computer memory 264. With specific reference to FIG. 3A, power controller memory 244 stores power controller firmware 320 which controls the operation of power controller 242 in controlling power management functions within power subsystem 240. Power controller memory 244 can store power data 324 including IHS power consumption or use data 326, switches/routers power use data 328, storage devices power use data 330, and other devices power use data 332. Power use data 326, 328, 330 and 332 are received from at least one of PSUs 246A-D and/or power meters 248A-D.

FIG. 3B illustrates contents of RAC memory 154. RAC memory 154 stores RAC firmware 340 which controls the operation of RAC 150 within IHS 100. RAC memory 154 can store IHS power use data 342 including average power 344 and instantaneous power 346. Instantaneous power 346 is received from power controller 242 and can have units of watts or joules. Average power 344 can be calculated by RAC 150 based on the instantaneous power consumed by the IHS over a period of time. Average power 344 can have units of kilowatt hours or mega-joule hours.

Turning to FIG. 3C, contents of management computer memory 264 are shown. Management computer memory 264 stores software such as an operating system (O/S) 360, and application(s) 362. Management computer memory 264 further stores power management firmware 364 which manages the power consumption within datacenter 200. Management computer memory 264 can store power model 366, time periods 368, historical power data 370 and new power use data/values for load shedding time periods 376. Power model 366 is a model of power use by datacenter 200 that can be used to predict future power usage. Time periods 368 are future periods of time that datacenter 200 consumes power. Time periods 368 can include future time periods of normal power supply, reduced power supply (brownouts), and no power supply (blackouts). Historical power data 370 includes power use data 372 and incoming supply power data 374. Power use data 372 is received over time from IHSs 210A-D and/or power subsystem 240 and stored. Incoming supply power data 374 is received over time from power sensor 280 and stored. New power use data/values for load shedding time periods 368 are power consumption values for each of the devices within datacenter 200 during a load shedding time period when the power supplier reduces the amount of incoming available supply power to the datacenter.

Power model 366 includes various parameters and values for the devices within datacenter 200. Examples of parameters and values include device support for power monitoring, power throttling (reduction of power), and power management (switch off/on remotely). The example parameters and values further include the minimum, maximum, and average power consumption values for the device over the monitored time intervals (e.g., every 15 minutes) through the historical time period (e.g. for last 1 year). Further examples of parameters and values include the measured absolute "minimum" and "maximum" power consumption values over the historical time period, the minimum amount of power required to keep the device functioning in the case of a maximum power throttling scenario, and the normal or regular power on/power off time ranges observed. This information is used in power model 366 to estimate the "maximum" power savings that can be achieved during the load shedding time period from each device within datacenter 200. The power model can also include compiled information about the specific set of devices in datacenter 200 that can have their power consumption throttled or reduced, the set of devices that consume a fixed amount of power, and a set of devices that are deemed to be non-essential. These power model factors are at an individual device granularity. The power model further includes models of the highest power consuming devices, the minimum power that needs to be available for functioning of these devices when they are throttled to the maximum and the minimum power that needs to be available for the functioning of these devices when some or all of the non-essential devices can be switched off and so on.

In one embodiment, processor 262, executing power management firmware 364, retrieves power model 366 and historical power data 370 for several devices (e.g., IHSs 210A-D, switches/routers 212, storage devices 214 and other devices 216) in datacenter 200. Processor 262 calculates, based on the power model 366 and historical power data 370, a first supply power from power supplier 270 that is available for distribution to the datacenter during a first load shedding time period. In one embodiment, the first load shedding time period is a future time period during which the power supplier is expected to reduce an amount of power available to the datacenter, based on a historically tracked/determined schedule of reduction by the power supplier of power available to the datacenter. In another embodiment, the first load shedding time period is a future time period during which the power supplier reduces an amount of power available to the datacenter, based on the load exerted on the power grid (tracked as peak power consumption hours). Processor 262 calculates a first power usage for the datacenter during the first (future) load shedding time period based on the power model 366 and historical power data 370 for the datacenter and determines if the first supply power is greater than the first power usage for the datacenter during the first load shedding time period. In response to determining that the first supply power is not greater than the first power usage for the datacenter during the first load shedding time period, processor 262 identifies at least one first device (e.g., one of IHSs 210A-D, switches/routers 212, storage devices 214 and other devices 216) in the datacenter to reduce power consumption. Processor 262 triggers the identified first device in the datacenter to reduce power consumption during the first load shedding time period. Processor 262 matches the first power usage with the first supply power during the first (future) load shedding time period. Normal power consumption can be resumed by the identified first device when the load shedding time period is over and the full complement of power required by the first power usage is available (i.e., sufficient levels of first supply power level is at or exceeds the first power usage).

Figure 4:
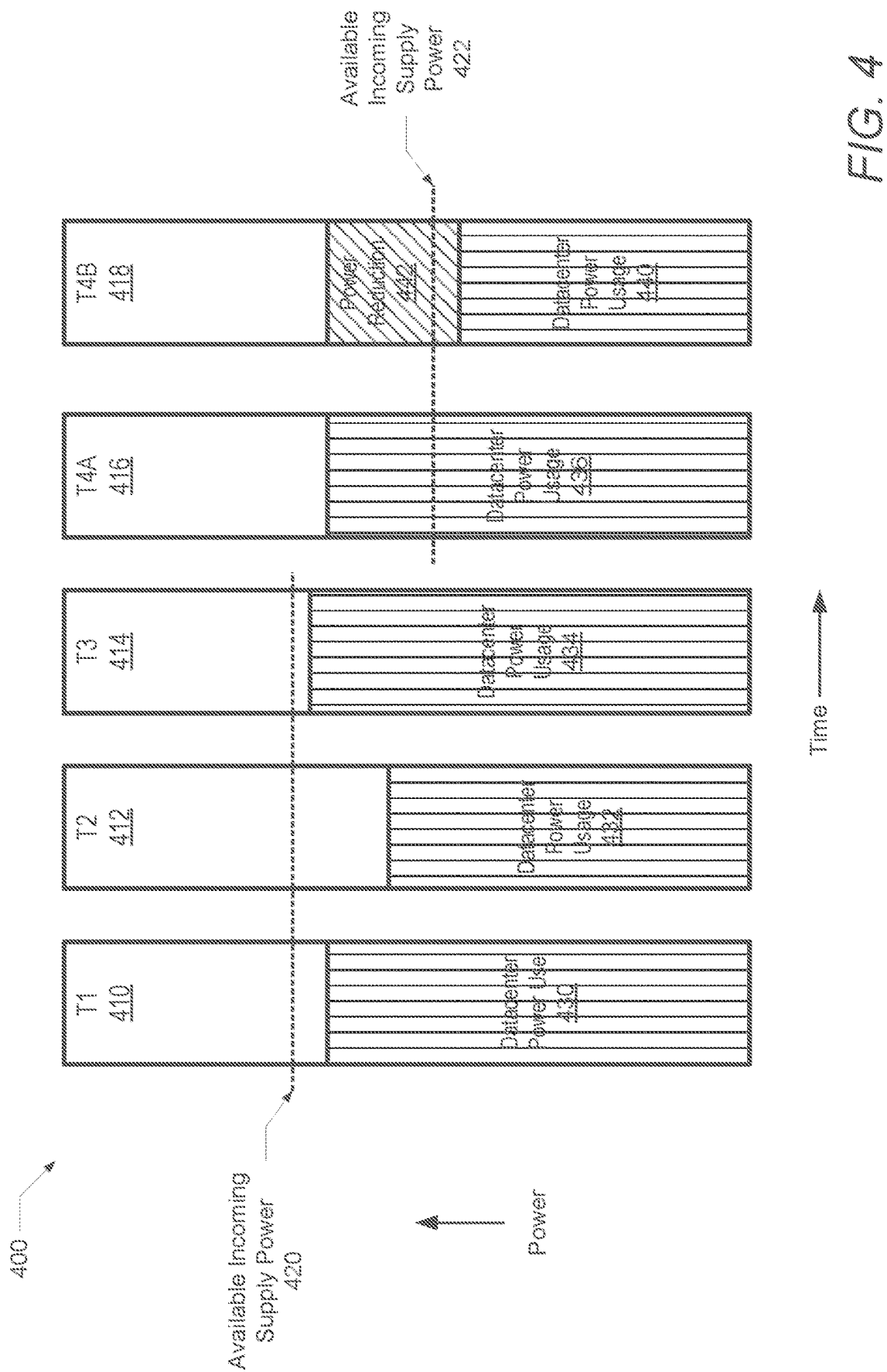
FIG. 4 is a diagram illustrating datacenter power usage during a load shedding time period, in accordance with one embodiment.

FIG. 4 illustrates one example diagram 400 of datacenter power usage during several time periods, including a load shedding time period. Diagram 400 includes time periods T1 410, T2 412, T3 414, and load shedding time periods T4A 416 and T4B 418. During time period T1 410, power supplier 270 provides a first available incoming supply power 420 and datacenter 200 consumes a first amount of power shown by datacenter power use 430. During time period T2 412, power supplier 270 provides first available incoming supply power 420 and datacenter 200 consumes a second amount of power shown by datacenter power use 432. During time period T3 414, power supplier 270 provides first available incoming supply power 420 and datacenter 200 consumes a third amount of power shown by datacenter power use 434. The first available incoming supply power is the same during time periods T1, T2 and T3. The power used or consumed by datacenter 200 during time periods T1-T3 is less than the available incoming supply power provided by the power supplier.

Before a future load shedding time period T4A 416 occurs, power supplier 270 provides a reduced amount of available incoming supply power 422 and datacenter 200 would be expected to consume an amount of power shown by datacenter power use 436. The power used or consumed by datacenter 200 before future load shedding time period T4A 416 is greater than the available incoming supply power provided by the power supplier. During future load shedding time period T4B 418, also subject to the reduced amount of available incoming supply power 422, management processor 262 has triggered one or more devices within datacenter 200 to reduce their respective power consumption (i.e., by power reduction 442), such that datacenter 200 consumes an amount of power shown by datacenter power use 440 during the future load shedding time period. The power used or consumed by datacenter 200 during future load shedding time period T4B 418 is less than the available incoming supply power provided by the power supplier (i.e., less than the reduced amount of available incoming supply power 422).

Figure 5A:
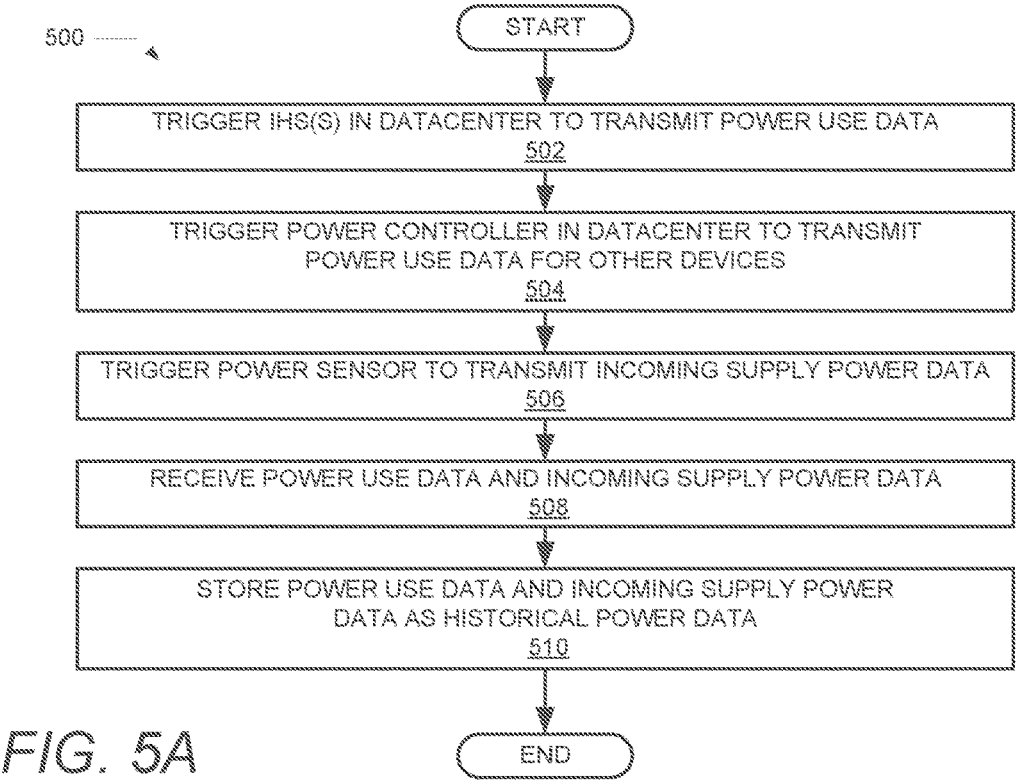
FIG. 5A is a flow chart illustrating one example of the method by which historical power data is monitored and recorded, according to one or more embodiments.
Figure 5B:
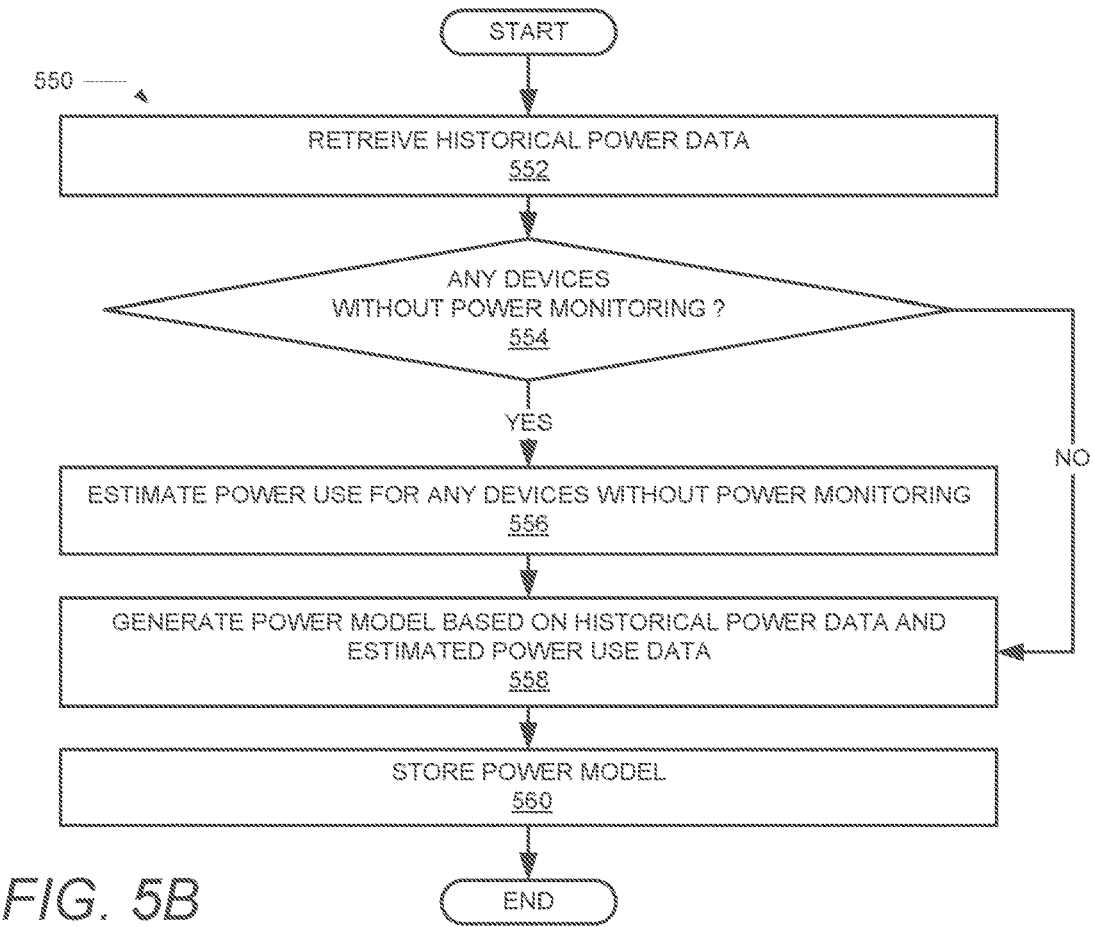
FIG. 5B is a flow chart illustrating one example of the method by which a power model is generated, according to one or more embodiments.

FIGS. 5A and 5B illustrate flowcharts of exemplary methods by which processor 262 within the preceding figures performs different aspects of the processes that enable the one or more embodiments of the disclosure. Method 500 represents a method for monitoring and recording historical power data within a datacenter. Method 550 represents a method for generating a power model. Generally, methods 500 and 550 represent computer-implemented methods. The description of methods 500 and 550 are provided with general reference to the specific components illustrated within the preceding FIGS. 1-4. Generally methods 500 and 550 are described as being implemented via processor 262 and particularly the execution of code provided by power management firmware 364 within processor 262. It is however appreciated that certain aspects of the described methods may be implemented via other processing devices and/or execution of other code.

With specific reference to FIG. 5A, method 500 begins at the start block and proceeds to block 502 where processor 262 triggers one or more of IHSs 210A-D to transmit IHS power use data 342 to processor 262. Processor 262 triggers power controller 242 to transmit power data 324 for other devices in datacenter 200 to processor 262 (block 504). Processor 262 triggers power sensor 280 to transmit incoming supply power data 374 to processor 262 (block 506). Processor 262 receives IHS power use data 342, power data 324, and incoming supply power data 374 (block 508). Processor 262 stores the IHS power use data 342, power data 324 and incoming supply power data 374 as historical power data 370 (block 510). Method 500 then ends.

Referring to FIG. 5B, method 550 begins at the start block and proceeds to block 552 where processor 262 retrieves historical power data 370 from management computer memory 264. Processor 262 determines if the historical power data is missing for any devices within datacenter 200, which indicates that the devices do not have power monitoring (decision block 554). In response to determining that the historical power data is missing for at least one device, processor 262 estimates power use data for the devices that do not have power monitoring (block 556). In one embodiment, the makes and models of the devices can be identified that do not have power monitoring and the power usage for these devices can be accessed from a local processor. Estimates for devices that do not support power monitoring can typically be specified by the user into the system, based upon the "faceplate" power consumption values for the device that form part of the product manuals. Alternatively, some estimates of power consumption for such devices are generated by measuring their power consumption from "metered" PDU sockets that allow reading power consumption information for individual sockets. In response to determining that historical power data 370 contains power use data for all of the devices within the datacenter (i.e., after block 556), processor 262 generates power model 366 (block 558) and stores power model 366 within management computer memory 264 (block 560). Method 550 then terminates.

Figure 6A:
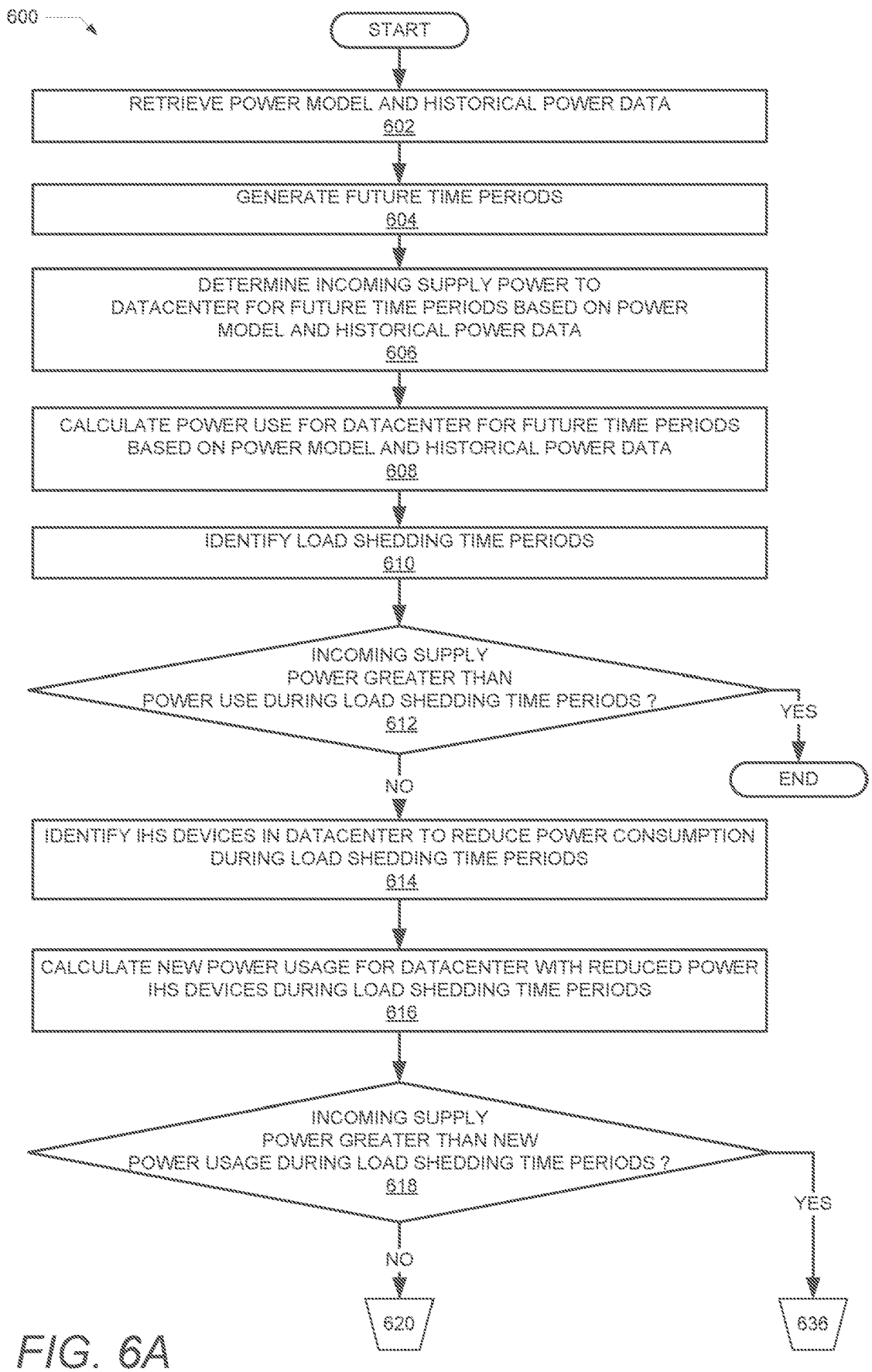
FIGS. 6A and 6B are a flowchart illustrating one example of the method by which power consumption is reduced in a datacenter during load shedding time periods, according to one or more embodiments.
Figure 6B:
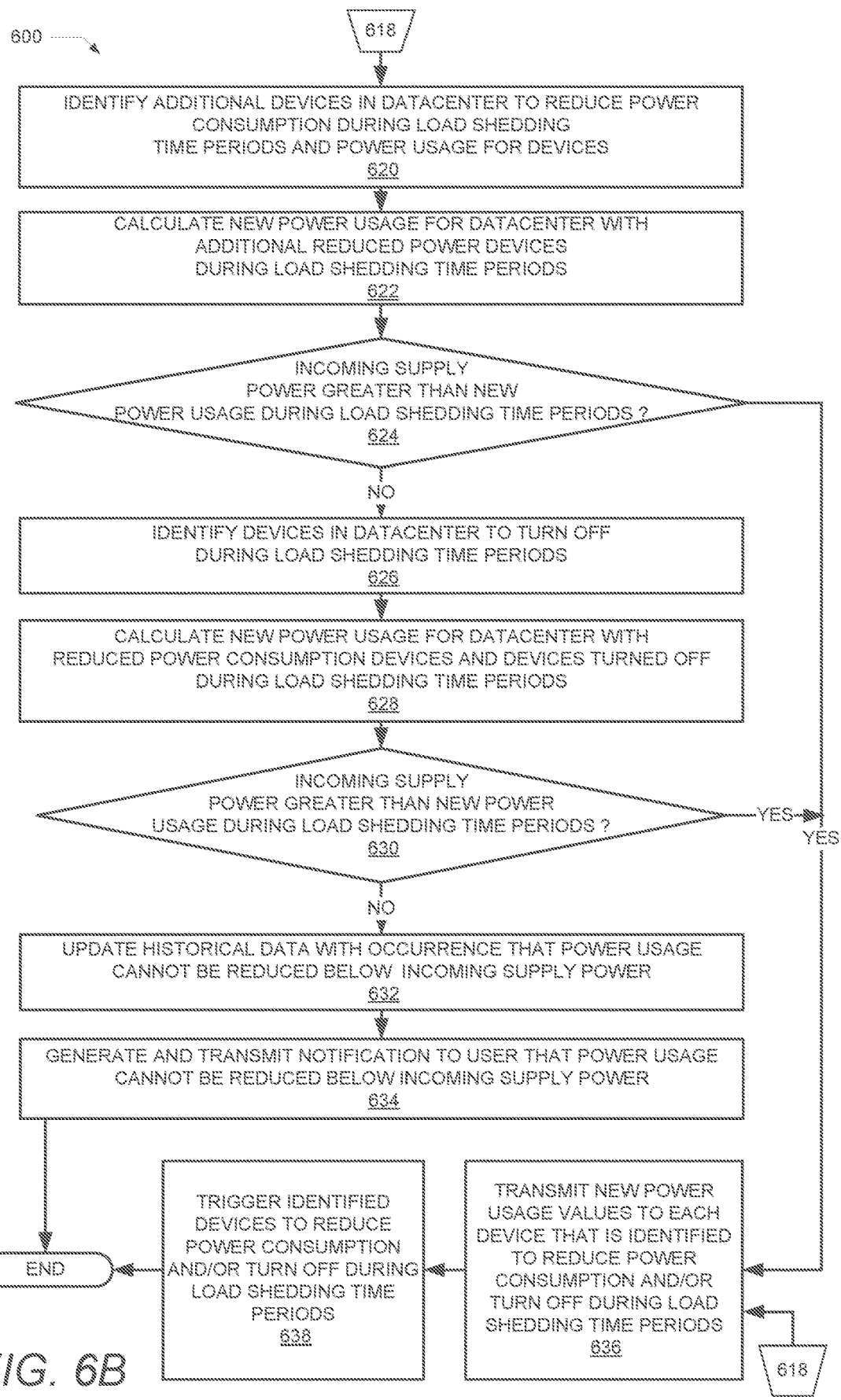

FIGS. 6A and 6B illustrate a flowchart of an exemplary method by which processor 262 within the preceding figures performs different aspects of the processes that enable the one or more embodiments of the disclosure. Method 600 represents a method for reducing power consumption a datacenter during future load shedding time periods. Generally, method 600 represents a computer-implemented method. The description of method 600 is provided with general reference to the specific components illustrated within the preceding FIGS. 1-4. Generally method 600 is described as being implemented via processor 262 and particularly the execution of code provided by power management firmware 222 within processor 262. It is however appreciated that certain aspects of the described methods may be implemented via other processing devices and/or execution of other code.

With specific reference to FIG. 6A, method 600 begins at the start block and proceeds to block 602 where processor 262 retrieves power model 366 and historical power data 370 from management computer memory 264. Processor 262 generates future time periods 368 based on a user selected pre-determined length for each time period and a user selected future number of weeks or months (block 604). Processor 262 determines expected incoming supply power for one or more future time periods based on power model 366 and historical power data. 370 (block 606). Processor 262 calculates power consumption or usage by datacenter 200 for one or more future time periods based on power model 366 and historical power data 370 (block 608).

Processor 262 identifies one or more load shedding time period(s) from among time periods 368 when power supplier 270 is reducing the amount of available incoming supply power to datacenter 200 (block 610). Processor 262 determines if the expected incoming supply power is greater than the calculated power usage for the datacenter during the load shedding time period(s) (decision block 612). In response to determining that the expected incoming supply power is greater than the calculated power usage for the datacenter during the load shedding time period, the power consumption level is maintained without change during the load shedding time period and method 600 ends. In response to determining that the expected incoming supply power is not greater than the power usage for the datacenter during the load shedding time period, processor 262 identifies at least one device in the datacenter to reduce the at least one device's power consumption (block 614). In one embodiment, processor 262 initially identifies one or more of IHSs 210A-D for throttling or reducing power consumption that can yield maximum power reduction and processor 262 incrementally throttles the one or more IHSs to the maximum allowed limit. Processor 262 calculates the power usage for the devices operating with reduced power consumption, and processor 262 calculates, for use during the load shedding time period(s), an overall new power usage for datacenter 200 with the identified reduced power consumption for those devices (block 616).

In another embodiment, processor 262 can determine a reduced power usage value for all of the devices within datacenter 200 that is less than the available incoming power supply. Processor 262 can identify which of the devices are best to throttle or reduce power based one or more pre-determined criteria for ranking or otherwise selecting devices/components to throttle or reduce power within datacenter 200.

Processor 262 determines if the incoming supply power is greater than the new power usage for the datacenter during the load shedding time period(s) (decision block 618). In response to determining that the incoming supply power is not greater than the new power usage for the datacenter during the load shedding time periods, processor 262 identifies at least one additional device in the datacenter to reduce the device's power consumption (block 620). Processor 262 then successively identifies other devices (i.e., one or more of switches/routers 212, storage devices 214, and other devices 216) that can yield the desired power reduction. Processor 262 calculates the power usage for the additional devices with reduced power consumption and calculates the overall new power usage for datacenter 200 with the identified additional reduced power devices having reduced power during the load shedding time period(s) (block 622).

Processor 262 determines if the incoming supply power is greater than the new power usage for the datacenter during the load shedding time periods (decision block 624). In response to determining that the incoming supply power is not greater than the new power usage for the datacenter during the load shedding time periods, processor 262 identifies at least one device in the datacenter that can be turned off, based on pre-determined criteria or list of devices that can be turned off, during the load shedding time periods to further reduce power consumption (block 626). In one embodiment, the devices identified to be turned off can be ranked in a pre-determined sequence to be turned off based on their respective priority of operation within datacenter 200. For example, a backup power supply can have a high priority to turn off during a load shedding event while a storage device would have a lower priority to be turned off during a load shedding event. Processor 262 calculates the overall new power usage for datacenter 200 with the additional devices turned off (block 628).

Processor 262 determines if the incoming supply power is greater than the overall new power usage for the datacenter during the load shedding time periods (decision block 630). In response to determining that the incoming supply power is not greater than the new power usage for the datacenter with additional devices turned off, processor 262 updates the historical power data 370 with the occurrence that that the incoming supply power is not greater than the new power usage for the datacenter with additional devices turned off (block 632). Processor 262 generates and transmits a notification to a user or system administrator that the power consumption or usage for datacenter 200 cannot be reduced below the amount of available incoming supply power during the future load shedding time periods (block 634). In one embodiment, upon receipt of a notification that the incoming supply power is insufficient, the user can activate an alternative power source such as a backup battery system. Alternatively, the processor powers down the device or places the device in a low power state (e.g., a sleep state). Method 600 then ends.

In response to determining that the incoming supply power is greater than the new power consumption or usage for the datacenter during the load shedding time periods (blocks 618, 624 and 630), processor 262 transmits the new calculated power usage values for the identified devices (i.e., one or more of IHSs 210A-D, switches/routers 212, storage devices 214, and other devices 216) with reduced power consumption and/or transmits the identity of devices to turn off during load shedding time periods (block 636). Processor 262 triggers the identified devices in datacenter 200 (i.e., one or more of IHSs 210A-D, switches/routers 212, storage devices 214, and other devices 216) with reduced power consumption to reduce power and/or turn off during load shedding time periods (block 638). Method 600 then terminates.

In one embodiment, when faced with a power reduction target (i.e. power reduction target 442), the power controller 242 identifies the maximum power reduction that can be achieved by throttling capable devices to the maximum limits, accounting for devices that are normally switched off during the load shedding time period, and switching off devices that have been identified as non-essential by the user. Power controller 242 transmits this data to processor 262. If the maximum power reduction that can be achieved by the above methodologies is not sufficient to cause the data center power usage 440 to be less than the available incoming supply power 422, processor 262 successively selects devices (i.e., one or more of IHSs 210A-D, switches/routers 212, storage devices 214, and other devices 216) that can yield maximum power reduction by incrementally throttling them to the maximum allowed limit. This is computed based on the power model previously generated, including the minimum amount of power required to keep devices functioning at acceptable limits when throttled to the maximum. Additional power reduction targets are achieved by turning off devices (one or more of IHSs 210A-D, and other devices 216) identified as non-essential by the user.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for power consumption management in a datacenter, the method comprising:

retrieving, by a processor, a power usage model and historical power data for a plurality of devices in the datacenter;

calculating, before a first future load shedding time period and based on the power usage model and historical power usage data, a first supply power from a power supplier that is available for distribution to the datacenter during the first future load shedding time period, the first future load shedding time period being a future time period during which the power supplier is expected to reduce an amount of power available to the datacenter;

calculating, based on the power usage model and historical power usage data for the datacenter, a first future power usage for the datacenter during the first future load shedding time period;

determining if the first supply power is greater than the first future power usage calculated for use by the datacenter during the first future load shedding time period;

in response to determining that the first supply power is not greater than the first future power usage for the datacenter during the first future load shedding time period, identifying, from the power usage model, at least one first device in the datacenter to reduce power consumption, the identifying comprising:

determining, from the power usage model, at least one non-essential device among the devices in the datacenter; and triggering the non-essential device to turn off; and
triggering the at least one first device in the datacenter to reduce power consumption during the first future load shedding time period.

2. The method of claim 1, further comprising:
calculating a second power usage for the datacenter during the first load shedding time period with the at least one first device having reduced power consumption;
determining if the first supply power is greater than the second power usage for the datacenter during the first load shedding time period;
in response to determining that the first supply power is not greater than the second power usage for the datacenter during the first load shedding time period, identifying at least one second device in the datacenter to reduce power consumption; and
triggering the at least one second device in the datacenter to reduce power consumption during the first load shedding time period.

3. The method of claim 1, further comprising:
determining if a second device in the datacenter is available to reduce power consumption during the first load shedding time period; and
in response to determining that no second device in the datacenter is available to reduce power consumption and that the first supply power is not greater than a calculated second power usage for the datacenter with one or more available devices in a reduced power consumption state during the first load shedding time period:
updating the historical power data with the occurrence that that the first supply power is not greater than the calculated second power usage;
generating a notification to a user that the second power usage cannot be reduced below the first supply power during the first load shedding time period; and
transmitting the notification to the user.

4. The method of claim 1, wherein triggering the at least one first device in the datacenter to reduce power consumption during the first load shedding time period further comprises:
determining a future power usage value for the at least one first device during the load shedding time period;
transmitting the future power usage value to the at least one first device; and
triggering the at least one first device to reduce power consumption based on the future power usage value.

5. The method of claim 1, wherein:
the power usage model comprises compiled information about a specific set of devices in the datacenter that can have their power consumption throttled or reduced, a set of devices that consume a fixed amount of power, and a set of devices that are deemed to be non-essential.

6. The method of claim 1, wherein identifying at least one of the devices in the datacenter to reduce power consumption further comprises:
determining at least one redundant power supply among the devices in the datacenter; and
triggering the redundant power supply to turn off.

7. The method of claim 1, further comprising:
triggering each of the devices in the datacenter that support power monitoring to transmit first power usage data for a plurality of time periods;
receiving the first power usage data from the devices that support power monitoring;
estimating second power usage data from devices in the datacenter that do not support power monitoring for the plurality of time periods;
storing the first and the second power usage data to the historical power data;
generating the power usage model based on the received first and second power usage data; and
storing the power usage model to a memory device.

8. An information handling system (IHS) comprising:
a network communication device communicatively coupling the IHS to a datacenter that includes a plurality of devices including at least one computing device and a power subsystem;
a memory device storing power consumption management firmware executing thereon to enable power consumption management of the datacenter; and
at least one management processor communicatively coupled to the plurality of devices via the network communication device and to the memory, and wherein the power consumption management firmware configures the at least one management processor to:
retrieve a power usage model and a historical power data for the devices in the datacenter;
calculate, before a first future load shedding time period and based on the power usage model and historical power usage data, a first supply power from a power supplier that is available for distribution to the datacenter during the first future load shedding time period, the first future load shedding time period being a future time period during which the power supplier is expected to reduce an amount of power available to the datacenter;
calculate, based on the power usage model and historical power usage data for the datacenter, a first future power usage for the datacenter during the first future load shedding time period;
determine if the first supply power is greater than the first future power usage calculated for use by the datacenter during the first future load shedding time period;
in response to determining that the first supply power is not greater than the first future power usage for the datacenter during the first future load shedding time period, identify, from the power usage model, at least one first device in the datacenter to reduce power consumption, wherein to identify the at least one first device the at least one management processor:
determines, from the power usage model, at least one non-essential device among the devices in the datacenter; and
triggers the non-essential device to turn off; and
trigger the at least one first device in the datacenter to reduce power consumption during the first load shedding time period.

9. The information handling system of claim 8, wherein the firmware further configures the management processor to:
calculate a second power usage for the datacenter during the first load shedding time period with the at least one first device having reduced power consumption;
determine if the first supply power is greater than the second power usage for the datacenter during the first load shedding time period;
in response to determining that the first supply power is not greater than the second power usage for the datacenter during the first load shedding time period, identify at least one second device in the datacenter to reduce power consumption; and trigger the at least one second device in the datacenter to reduce power consumption during the first load shedding time period.

10. The information handling system of claim 8, wherein the firmware further configures the management processor to:

determine if a second device in the datacenter is available to reduce power consumption during the first load shedding time period; and in response to determining that no second device in the datacenter is available to reduce power consumption and that the first supply power is not greater than a calculated second power usage for the datacenter with one or more available devices in a reduced power consumption state during the first load shedding time period:

update the historical power data with the occurrence that that the first supply power is not greater than the calculated second power usage;

generate a notification to a user that the second power usage cannot be reduced below the first supply power during the first load shedding time period; and transmit the notification to the user.

11. The information handling system of claim 8, wherein triggering the at least one first device in the datacenter to reduce power consumption during the first load shedding time period comprises the firmware further configuring the management processor to:

determine a future power usage value for the at least one first device during the load shedding time period;

transmit the future power usage value to the at least one first device; and trigger the at least one first device to reduce power consumption based on the future power usage value.

12. The information handling system of claim 8, wherein:

the power usage model comprises compiled information about a specific set of devices in the datacenter that can have their power consumption throttled or reduced, a set of devices that consume a fixed amount of power, and a set of devices that are deemed to be non-essential.

13. The information handling system of claim 8, wherein identifying at least one of the devices in the datacenter to reduce power consumption comprises the firmware further configuring the management processor to:

determine at least one redundant power supply among the devices in the datacenter; and trigger the redundant power supply to turn off.

14. The information handling system of claim 8, wherein the firmware further configures the management processor to:

trigger each of the devices in the datacenter that support power monitoring to transmit first power usage data for a plurality of time periods;

receive the first power usage data from the devices that support power monitoring;

estimate second power usage data from devices in the datacenter that do not support power monitoring for the plurality of time periods;

store the first and the second power usage data to the historical power data;

generate the power usage model based on the received first and second power usage data; and store the power usage model to a memory device.

15. A power management system comprising:

a datacenter including a plurality of devices, the plurality of devices including a power subsystem providing power distribution to the datacenter the power subsystem including at least one power supply unit (PSU); and a management computer communicatively coupled to the datacenter including at least one computing device and the power subsystem, the management computer having at least one management processor and a memory device storing power consumption management firmware executing thereon for power consumption management, wherein the firmware configures the at least one management processor to:

retrieve a power usage model and a historical power data for the devices in the datacenter;

calculate, before a first future load shedding time period and based on the power usage model and historical power usage data, a first supply power from a power supplier that is available for distribution to the datacenter during the first future load shedding time period, the first future load shedding time period being a future time period during which the power supplier is expected to reduce an amount of power available to the datacenter;

calculate, based on the power usage model and historical power usage data for the datacenter, a first future power usage for the datacenter during the first future load shedding time period;

determine if the first supply power is greater than the first future power usage calculated for use by the datacenter during the first future load shedding time period;

in response to determining that the first supply power is not greater than the first future power usage for the datacenter during the first future load shedding time period, identify, from the power usage model, at least one first device in the datacenter to reduce power consumption, wherein to identify the at least one first device, the at least one management processor:

determines, from the power usage model, at least one non-essential device among the devices in the datacenter; and triggers the non-essential device to turn off; and trigger the at least one first device in the datacenter to reduce power consumption during the first load shedding time period.

16. The power management system of claim 15, wherein the power usage model comprising compiled information about a specific set of devices in the datacenter that can have their power consumption throttled or reduced and the firmware further configures the management processor to:

calculate a second power usage for the datacenter during the first load shedding time period with the at least one first device having reduced power consumption;

determine if the first supply power is greater than the second power usage for the datacenter during the first load shedding time period;

in response to determining that the first supply power is not greater than the second power usage for the datacenter during the first load shedding time period, identify at least one second device in the datacenter to reduce power consumption; and trigger the at least one second device in the datacenter to reduce power consumption during the first load shedding time period.

17. The power management system of claim 15, wherein the firmware further configures the management processor to:
- determine if a second device in the datacenter is available to reduce power consumption during the first load shedding time period; and
- in response to determining that no second device in the datacenter is available to reduce power consumption and that the first supply power is not greater than a calculated second power usage for the datacenter with one or more available devices in a reduced power consumption state during the first load shedding time period:
  - update the historical power data with the occurrence that that the first supply power is not greater than the calculated second power usage;
  - generate a notification to a user that the second power usage cannot be reduced below the first supply power during the first load shedding time period; and
  - transmit the notification to the user.

18. The power management system of claim 15, wherein triggering the at least one first device in the datacenter to reduce power consumption during the first load shedding time period comprises the firmware further configuring the management processor to:
- determine a future power usage value for the at least one first device during the load shedding time period;
- transmit the future power usage value to the at least one first device; and
- trigger the at least one first device to reduce power consumption based on the future power usage value.

19. The power management system of claim 15, wherein:
- the power usage model comprising compiled information about a specific set of devices in the datacenter that can have their power consumption throttled or reduced, a set of devices that consume a fixed amount of power, and a set of devices that are deemed to be non-essential.

20. The power management system of claim 15, wherein identifying at least one of the devices in the datacenter to reduce power consumption comprises the firmware further configuring the management processor to:
- determine at least one redundant power supply among the devices in the datacenter; and
- trigger the redundant power supply to turn off.

* * * * *